Patented June 22, 1937

2,084,710

UNITED STATES PATENT OFFICE 2,084,710

METHOD FOR THE PRODUCTION OF ALKYL CHLORIDES FROM ALKYL ETHERS

Harold M. Spurlin, Wilmington, Del., assignor to Hercules Powder Company, Wilmington, Del., a corporation of Delaware No Drawing. Application August 21, 1935, Serial No. 37,175

13 Claims.  (Cl. 260—162)

This invention relates to the production of alkyl chlorides, and more particularly their production from di-alkyl ethers. One embodiment of this invention is directed to the production of alkyl chlorides from crude mixtures containing alkyl ethers, such as the crude mixtures which are recovered in the production of alkyl celluloses.

In the production of alkyl celluloses as, for example, ethyl cellulose, propyl cellulose, butyl cellulose, etc., alkali cellulose is treated with an alkyl chloride, as ethyl chloride, propyl chloride, butyl chloride, etc. In addition to the alkyl cellulose which is the desired reaction product, there are formed various by-products, principally the alkyl alcohol and the dialkyl ether, corresponding to the chloride employed.

These by-products are of little commercial value and it is desirable to treat the crude reaction mixtures, after the separation of the cellulose ether, so as to produce therefrom alkyl chlorides, which can be used once more in the production of cellulose ether. Heretofore it has been known to produce alkyl chlorides by the reaction of an alkyl alcohol with hydrochloric acid in the presence of zinc chloride. Such a process is disclosed in U. S. Patent No. 1,824,951 to Frei. The corresponding reaction for the production of alkyl chlorides from alkyl ethers has not been shown by the prior art and would, in fact, seem impossible since, in the production of alkyl chlorides from alkyl alcohols, ethers have been formed as by-products. Thus in U. S. Patent No. 1,816,845 to Harding, the patentee points out that the low yield of ethyl chloride by the reaction of ethyl alcohol with hydrochloric acid in the presence of zinc chloride as a catalyst has been due to the production of di-ethyl ether as a by-product. This production of alkyl ether has been due to the dehydration of alcohol.

Now, I have discovered that I can react di-alkyl ether with hydrochloric acid in the presence of a catalyst and obtain a high yield of alkyl chloride. I have found further that I can react mixtures of di-alkyl ethers and the corresponding alkyl alcohol, such as the by-product mixture resulting from the etherification of cellulose, with a hydrochloric acid in the presence of a catalyst and secure a conversion of both the ether and the alcohol, with excellent yields.

In accordance with this invention, then, a di-alkyl ether as, for example, di-methyl ether, di-ethyl ether, di-propyl ether, di-butyl ether, etc., can be converted into the corresponding alkyl chloride by treatment with hydrogen chloride. Further, in accordance with this invention, a crude reaction mixture from the production of an alkyl cellulose containing a di-alkyl ether and an alkyl alcohol can be treated with a hydrogen chloride, with the consequent conversion of both the alkyl alcohol and the di-alkyl ether to alkyl chloride, two molecules of alkyl chloride being produced from each molecule of the di-alkyl ether.

The method in accordance with this invention broadly comprises, therefore, the treatment of a di-alkyl ether, either alone or in admixture with other materials, with hydrogen chloride, and more specifically the treatment of the crude mixture obtained by the alkylation of cellulose with hydrogen chloride for the conversion of the di-alkyl ether contained therein. The treatment is desirably carried out in the presence of a suitable catalyst as, for example, a heavy metal chloride as zinc chloride, antimony trichloride, ferric chloride, stannous chloride, etc., and is preferably carried out at an elevated temperature and pressure. In any case, a relationship is maintained between temperature and pressure such as to keep the reactants substantially in the liquid phase. This is essential to a high yield, since the reaction takes place in the liquid phase.

The use of a catalyst in the production of alkyl chlorides from di-alkyl ethers, in accordance with this invention, is not essential to secure reaction. However, the use of a catalyst such as, for example, a heavy metal chloride, as zinc chloride, antimony trichloride, stannic chloride, mixtures of stannous and stannic chlorides, ferric chloride, etc., is desirable, since it increases both the rate of reaction and the yield enormously. Thus, for example, I have found that it is possible to react di-ethyl ether with hydrochloric acid to produce ethyl chloride, in the absence of a catalyst, to give a yield approximately 40% theoretical by using a comparatively long reaction period, with a total recovery of 96% of the starting material as unconverted ether and ethyl chloride. The same reactants, under comparable reaction conditions, except with zinc chloride present as a catalyst, gave a yield of 94% theoretical in a very short reaction period, the unconverted ether bringing the total recovery of starting material to 97%.

Each of the various factors involved in the reaction has an effect on the rate of reaction and the yield. Thus, if we consider the rate of reaction of an alkyl ether such as ethyl ether, we find the reaction proceeds in the presence of an aqueous solution of a catalyst at temperatures as low as 80° C. As the temperature is increased the rate of reaction increases, provided the pressure is sufficient to maintain a liquid phase. For this reason it is desirable to operate at as high a temperature as practical, with a correspondingly high pressure. There is an upper temperature limitation, however, since at higher temperatures the ethers are dehydrated to unsaturated hydrocarbons. Thus, at temperatures above 240° C. the dehydration of ethyl ether to ethylene becomes very rapid, and it is not desirable to exceed this temperature. I have found that the reaction can be carried out very satisfactorily within the range of about 80° C. to about 210° C. In practice, however, I prefer to maintain a temperature within the narrow range of about 160° C. to about 180° C.

It is necessary to carry the reaction out in the liquid phase to secure intimate contact between the ether, the hydrogen halide and catalyst. For this reason, it is desirable to maintain sufficient pressure on the reaction vessel to keep the ether and/or water liquid at the temperature at which the reaction is carried out. Higher pressures may, however, be used, and are advantageous in increasing the concentration of HCl in the water phase. Pressures within the range of atmospheric to about 1000 lbs. per square inch gauge will usually be satisfactory.

As the water content of the catalyst solution increases the reaction rate increases, at any temperature below the melting point of the catalyst, until all the catalyst is in solution, then starts to fall off. It is therefore desirable to use enough water to insure solution of the catalyst at the temperature of operation, but not enough to cause the reaction rate to fall off appreciably. It has been found desirable to maintain the ratio of zinc chloride to water within the range of about 1:1 to about 6:1.

The hydrogen chloride used may be in the gaseous phase or in aqueous solution, the latter procedure being more convenient. Increasing the hydrogen chloride concentration in the aqueous phase of the reaction mixture increases the rate of reaction, so the aqueous solution of the hydrogen chloride will be highly concentrated. In the reaction of di-ethyl ether with hydrogen chloride it has been found that aqueous solutions containing from about 30% to about 37% HCl are satisfactory.

The proportion of ether to hydrogen chloride may be varied somewhat, but it is preferable to use them in the ratio of one mol. of ether to two mols of the hydrogen chloride. If it is desired to drive the reaction to completion and secure complete conversion of the ether, an excess of the hydrogen chloride is necessary. This is ordinarily neither necessary nor desirable, due to the high yield secured in the reaction. However, under reaction conditions such that complete conversion is not secured, as when the reactants are passed through the reaction zone too rapidly to allow sufficient time for complete conversion, it may be desirable to use the excess alkyl ether to avoid recovery of unreacted hydrogen chloride.

From the foregoing it will be understood that increasing the concentration of ether, hydrogen chloride and catalyst, and decreasing that of water, increases the reaction rate. However, the amount of water present cannot well be diminished below that necessary to secure an aqueous solution of the catalyst. It will thus be seen that at each condition of temperature and pressure there is some optimum ratio among the constituents in the reacting chamber.

The products of the reaction tend to reduce the reaction rate by lowering the concentration of some of the reactants. If the pressure is low enough for there to be a vapor phase, a mixture of water, alkyl chloride, alkyl ether and hydrogen chloride volatizes, decreasing the concentration of ether in the reacting phase. This, of course, is especially important where the ether is highly volatile at the temperature of reaction, as in the case of the lower alkyl ethers. If the pressure is high enough for there to be present a liquid phase of ether or ether-alkyl chloride mixture, then the concentration of ether in the reaction mixture is determined by that in this layer. As the product of the reaction increases in quantity, the alkyl ether-alkyl chloride phase, be it liquid or gaseous, always increases, as the alkyl chlorides are practically insoluble in the aqueous catalyst solution.

There is still another matter to be considered. This is the per cent. of the theoretical yield obtained. Loss of yield with an alkyl ether such as di-ethyl ether is almost entirely due to dehydration of the ether with the formation of ethylene. This is polymerized to a slight extent, but largely leaves the system as such. Two factors favor this loss, high temperature and high catalyst-water ratio. It is possible to go as high at 6:1 catalyst-water ratio and 210° C., without excessive formation of ethylene. A ratio of 4:1 and 180° C. is to be preferred, however. In order to secure the optimum ether concentration in the reaction phase, quite a high partial pressure of ether above the reaction mixture is necessary. As alkyl chloride seems quite stable in the reaction mixture, there is no great objection to accumulation of considerable quantities of the product in the reaction mixture, although the reaction is thereby slowed down.

The following procedures are illustrative of the method in accordance with this invention in practical form.

When ethyl ether is to be converted to ethyl chloride, the reaction may be carried out by feeding a mixture of hydrogen chloride, di-ethyl ether and (if desired) water into a suitable reaction vessel provided with a stirring device containing a solution of zinc chloride, in water in desired ratio, for example from about 2 to about 5 parts by weight of zinc chloride per part of water, at a temperature of from about 100° C.–200° C., the raw materials fed in being heated to 200° C., carrying the gases escaping from the reaction mixture to separate the components (ether, ethyl chloride, hydrogen chloride and water), and returning the ether to the feed. The temperature, pressure and composition of feed may be so adjusted that the $ZnCl_2$-water ratio in the reaction mass remains constant, the gases leaving containing enough water to balance that formed in the reaction plus that fed, if any. A pressure of 15 to 50 lbs. per square inch will desirably be maintained in the system. The higher the pressure, the more the ether and HCl dissolves in the reaction mass and the faster the reaction. As the pressure is increased, the water in the feed must be decreased at any one temperature in order to enable the water formed in the reaction to be volatilized.

This procedure is limited to such combinations of temperature and pressure as will enable the water formed in the reaction, together with the unchanged ether and ethyl chloride, to be discharged in the vapor state from the reaction. This is a convenient method of operation, but has the disadvantage that the feed must be volatilized at the pressure of the reaction. This, together with the other limitation on pressure, may be avoided by maintaining enough pressure on the system to keep everything in the liquid phase, feeding a liquid mixture of hydrogen chloride, di-ethyl ether and possibly water to the reaction, removing a portion of the reaction mixture at intervals or continuously reducing the pressure over this portion to allow removal of water and ethyl chloride, and then recompressing the remainder and returning it to the reaction system, either with the feed or separately. The pressure may be secured by pumps, or more advantageously by using a sufficient hydrostatic head between the reaction vessel and its outlets and inlets.

The following examples were carried out in a reacting vessel of about 800 cc. total volume, under a pressure of 15 lb. gage. In each case the amount of $ZnCl_2$ indicated was introduced into the apparatus with sufficient water to form a fluid mixture, then brought up to pressure and water boiled out until the desired temperature was reached. The ether and HCl were then started at the indicated rates. The ether was in all cases fed in as a liquid, the hydrogen chloride and water as indicated.

| Run No. | Av. reaction temp. | Grams $ZnCl_2$ | Rate of feed—ether g./hr. | HCl g./hr. | $H_2O$ g./hr. |
|---|---|---|---|---|---|
| | Degrees centigrade | | | | |
| 1 | 176 | 500 | 940 | 195 | 330 |
| 2 | 195 | 500 | 700 | 150 | 255 |
| 3 | 170 | 500 | 1080 | 410 | 0 |
| 4 | 154 | 550 | 1300 | 408 | 0 |
| 5 | 143 | 500 | 1300 | 375 | 0 |
| 6 | 125 | 500 | 865 | 275 | 0 |
| 7 | 111 | 300 | 865 | 280 | 0 |

| Run No. | State of feed—HCl and $H_2O$ gaseous or liquid | Percent conversion per pass: ether | Percent conversion per pass: HCl | Rate of production— EtCl g./hr. | Percent yield |
|---|---|---|---|---|---|
| 1 | L | 11 | 54 | 184 | 92 |
| 2 | G | 15 | 72 | 187 | 93 |
| 3 | G | 26 | 61 | 480 | 94 |
| 4 | G | 15 | 43 | 335 | 98 |
| 5 | G | 17 | 57 | 380 | 95 |
| 6 | G | 23 | 66 | 340 | 99 |
| 7 | G | 12 | 22 | 160 | 94 |

Another procedure in accordance with the method of this invention is to pass a mixture of alkyl ether, hydrogen chloride, catalyst and sufficient water to render the mixture fluid through an elongated reaction zone maintained at an elevated temperature, under pressure sufficient to keep the reactants in liquid phase at the reaction temperature. Thus, for the production of ethyl chloride from di-ethyl ether, a mixture of di-ethyl ether, hydrogen chloride and water may be passed through a small diameter glass wall tube immersed in an oil bath at an elevated temperature.

The following is an example of this procedure as applied to the production of ethyl chloride from di-ethyl ether. A mixture of 141 g. of di-ethyl ether, 139 g. of anhydrous HCl, 575 g. of $ZnCl_2$ and 350 g. of water was passed through a glass coil of 5 mm. internal diameter having a capacity of 100 cc., in a period of 16 minutes, under a pressure of 400 lbs. per sq. in. The coil was immersed in an oil bath which was maintained at a temperature of 152° C. during the run. From the coil the mixture passed through a pressure-reducing valve into a steam separator, where the ethyl chloride and unreacted ether was vaporized. This gaseous mixture was then fractionated, yielding 235 cc. of ethyl chloride. Distillation of the water phase yielded an additional 27 cc. of ethyl chloride, giving a total yield of 98% of the theoretical yield, in one pass.

It will be understood that the details and examples hereinbefore set forth are illustrative only, and that the invention as broadly described and claimed is in no way limited thereby.

What I claim and desire to protect by Letters Patent is:

1. The method of producing an alkyl chloride which includes reacting a dialkyl ether with hydrogen chloride in the presence of added water at a temperature within the range of about 80° C. to about 240° C. and under pressure sufficient to keep the water substantially in the liquid phase.

2. The method of producing an alkyl chloride which includes reacting a dialkyl ether with hydrogen chloride in the presence of an aqueous solution of a heavy metal chloride at a temperature within the range of about 80° C. to about 240° C. and under pressure sufficient to keep the water in the aqueous solution substantially in the liquid phase.

3. The method of producing an alkyl chloride which includes reacting a dialkyl ether with hydrogen chloride in the presence of an aqueous solution of a heavy metal chloride containing at least one part by weight of water to six parts by weight of a heavy metal halide, at a temperature within the range of about 80° C. to about 240° C. and under a pressure sufficient to keep at least one part of water by weight to six parts by weight of the heavy metal halide present in liquid phase.

4. The method of producing an alkyl chloride which includes reacting a dialkyl ether with hydrogen chloride in the presence of an aqueous solution of a heavy metal chloride containing a ratio of water to heavy metal chloride in parts by weight within the range of about 1:1 to about 1:6, at a temperature within the range of about 80° C. to about 240° C. and under a pressure sufficient to keep at least one part of water by weight to six parts by weight of the heavy metal halide present in liquid phase.

5. The method of producing an alkyl chloride which includes reacting a dialkyl ether with hydrogen chloride in the presence of an aqueous solution of a heavy metal chloride selected from the group consisting of zinc chloride, antimony trichloride, stannous chloride, and ferric chloride, at a temperature within the range of 80° C. to 240° C. and under pressure sufficient to keep the reactants substantially in the liquid phase.

6. The method of producing ethyl chloride which includes reacting diethyl ether with hydrogen chloride in the presence of an aqueous solution of a heavy metal chloride selected from the group consisting of zinc chloride, antimony trichloride, stannous chloride, and ferric chloride, at a temperature within the range of 80° C. to 240° C. and under pressure sufficient to keep the reactants substantially in the liquid phase.

7. The method of producing ethyl chloride which includes reacting diethyl ether with hydrogen chloride in the presence of an aqueous solution of a heavy metal chloride containing at least one part by weight of water to six parts by weight of a heavy metal halide, at a temperature within the range of about 80° C. to about 240° C. and under a pressure sufficient to keep at least one part of water by weight to six parts by weight of the heavy metal halide present in liquid phase.

8. The method of producing ethyl chloride which includes reacting diethyl ether with hydrogen chloride in the presence of an aqueous solution of a heavy metal chloride containing a ratio of water to heavy metal chloride in parts by weight within the range of about 1:1 to about 1:6, at a temperature within the range of about 80° C. to about 240° C. and under a pressure sufficient to keep at least one part of water by weight to six parts by weight of the heavy metal halide present in liquid phase.

9. The method of producing ethyl chloride which includes reacting diethyl ether with hydrogen chloride in the presence of added water at a temperature within the range of about 80° C. to about 240° C. and under pressure sufficient to keep the water substantially in the liquid phase.

10. The method of producing an alkyl chloride which includes reacting a dialkyl ether with hydrogen chloride in the presence of added water at a temperature within the range of about 160° C. to about 180° C. and pressure sufficient to keep the water substantially in the liquid phase.

11. The method of producing ethyl chloride which includes reacting diethyl ether with hydrogen chloride in the presence of added water at a temperature within the range of about 160° C. to about 180° C. and pressure sufficient to keep the water substantially in the liquid phase.

12. The method of producing ethyl chloride which includes reacting diethyl ether with hydrogen chloride in the presence of an aqueous solution of a heavy metal chloride at a temperature within the range of about 160° C. to about 180° C. and pressure sufficient to keep the water substantially in the liquid phase.

13. The method of producing ethyl chloride which includes reacting diethyl ether with hydrogen chloride in the presence of an aqueous solution of a heavy metal chloride at a temperature within the range of about 80° C. to about 240° C. and under pressure sufficient to keep the water in the aqueous solution substantially in the liquid phase.

HAROLD M. SPURLIN.